Feb. 26, 1952  B. C. BARTON ET AL  2,587,274
RUBBER SURFACE TREATMENT AND ARTICLE
Filed March 19, 1949

INVENTORS
BERNARD C. BARTON
EDWARD E. AUER
BY
Robert J. Patterson
ATTORNEY

Patented Feb. 26, 1952

2,587,274

UNITED STATES PATENT OFFICE 2,587,274

RUBBER SURFACE TREATMENT AND ARTICLE

Bernard C. Barton, Clifton, and Edward E. Auer, East Orange, N. J., assignors to United States Rubber Company, New York, N. Y., a corporation of New Jersey Application March 19, 1949, Serial No. 82,377

5 Claims. (Cl. 117—118)

1

This invention relates to a method of treating vulcanized rubber articles, and to improved vulcanized rubber articles obtained thereby. More particularly, this invention relates to a method of surface treating vulcanized rubber articles which are to be used in connection with processes of manufacturing other vulcanized rubber articles.

A principal object of the present invention is to provide a method of altering the surface characteristics of vulcanized rubber articles to prevent the deterioration of said articles when exposed to elevated temperatures in contact with a vulcanized rubber body.

Another object is to prevent surface cracking of vulcanized rubber belts and the like, which are repeatedly exposed in service to the deteriorating effects of heat in the presence of sulfur.

Still another object is to provide a method of protecting vulcanized rubber surfaces from embrittlement by contact with a vulcanizable composition at elevated temperature, without adversely affecting the vulcanizing characteristics of said vulcanizable composition.

It is also an object of the invention to treat vulcanized rubber articles by a method which accomplishes the foregoing objects but is not deleterious to the physical properties of the article.

A further object of the invention is to provide a method of treating vulcanized rubber articles so as to accomplish the foregoing objects without presenting any fire hazard or dangerous toxicity hazard in the factory.

Figure 1:
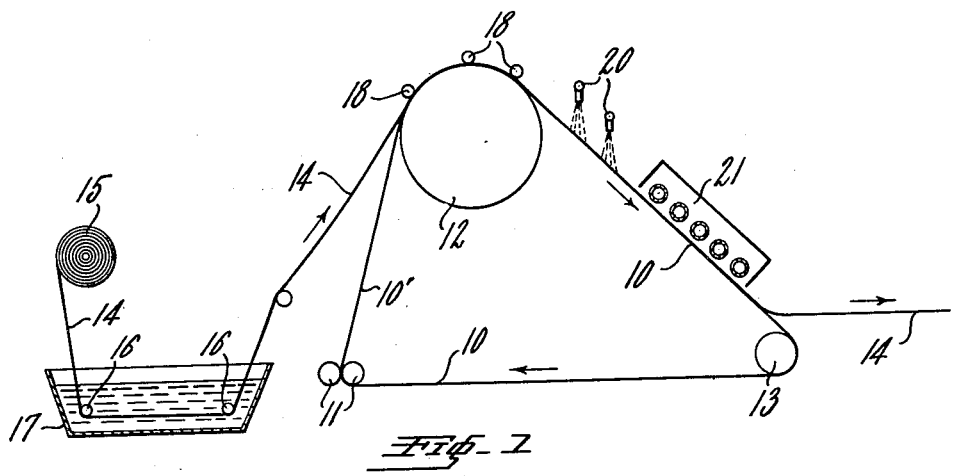
Figure 2:
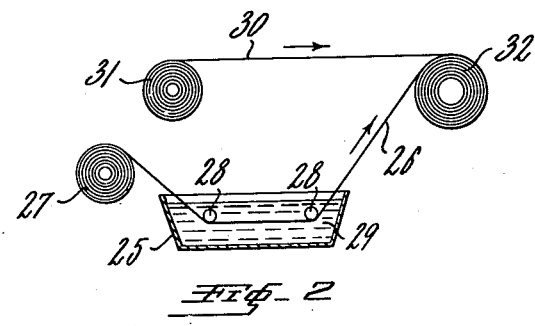
Figure 3:
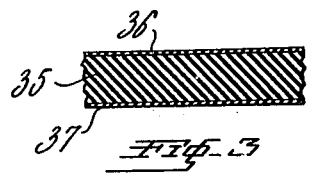

The problem which it is an object of the present invention to solve arises particularly in connection with certain processes for manufacturing rubberized elastic fabric, such as is illustrated in the accompanying drawing, wherein Fig. 1 is a largely diagrammatic representation of an apparatus for assembling a rubberfabric composite article and vulcanizing same in contact with a vulcanized rubber belt, Fig. 2 of the drawing represents a preferred method of treating the said vulcanized rubber belt according to the present invention, and Fig. 3 is a cross-sectional view of the vulcanized belt after subjection to the treatment of our invention.

2

Referring to Fig. 1 of the drawing, a vulcanized endless rubber belt 10 is shown in a machine for manufacture of rubberized elastic fabric. The purpose of this belt is to serve as a carrier for conveying the fabric 14 to be rubberized and for causing the fabric 14 to assume a condensed or contracted state before it is rubberized, so that the final rubber treated fabric will be highly extensible. The belt 10 passes through a pair of driven pinch rolls 11, and thence around a revolving drum 12, and thereafter around a roller 13. The drum 12 is driven at a somewhat faster speed than the pinch rolls 11, so that the section 10' of the belt 10 between the pinch rolls 11 and the drum 12 is in tension. As the belt passes around the drum 12, it contracts gradually and the tension is relieved.

A textile cloth 14 from which it is desired to make a highly elastic fabric passes from a supply roll 15 and under rollers 16 immersed in water or other liquid contained in a trough 17. The wet fabric 14 then passes upwardly and is applied to the tensioned section 10' of the belt 10 as it passes around the drum 12. The wet fabric is pressed firmly against the belt by floating and free-running rollers 18. The effect of this is to cause the wet fabric 14 to adhere to the stretched underlying belt 10, and since this belt is permitted to contract gradually as it approaches the point where it leaves the drum 12, the fabric will be condensed by the contraction of the belt to which it adheres as a result of its wet condition. That is, the adjacent parts of the fabric 14 will be crowded more closely together.

The condensed fabric 14 and underlying vulcanized rubber belt 10 pass beneath spraying nozzles 20 which serve to spray upon the fabric 14 a vulcanizable rubber-containing fluid, usually latex. This latex saturates or impregnates the fabric 14. The latex-treated fabric 14 then passes a heating element 21 which dries and vulcanizes the latex in and on the condensed fabric. The treated fabric 14 is thereafter removed from the rubber belt 10 and is taken up or further treated by suitable means (not shown). The belt 10 continues around the roller 13 and through the pinch rolls 11 to receive more fabric to be treated. The rubberized fabric manufactured in this way is highly extensible. Processes of this type in which rubberized fabric is vulcanized in contact with a vulcanized rubber belt, are well known. Our invention is applicable to the treatment generally of vulcanized rubber articles, typified by these rubber belts, which in service come into contact with sulfur-containing vulcanizable compositions at elevated temperatures with a resulting normal tendency to rapid deterioration of the articles.

In this process, the endless vulcanized rubber belt 10 is repeatedly subjected to vulcanizing temperatures of, for example, 210° to 240° F., as it passes before the heater 21. At the same time the vulcanized belt is in contact with the vulcanizable latex composition which contains sulfur. Some of the sulfur migrates from the latex into the surface of the vulcanized rubber belt. This repeated exposure of the vulcanized belt to elevated temperatures and migratory sulfur from the latex results, after a relatively brief period of service, in over-vulcanization of the surface of the belt with consequent embrittlement and cracking of the surface. This over-vulcanization in the presence of heat and migratory sulfur is possible because the vulcanized rubber contains a vulcanization accelerator and zinc oxide or an equivalent combined zinc activator of vulcanization, such as zinc soaps, for example, zinc stearate and the like, which was put into the rubber compound during manufacture of the belt to activate the vulcanization thereof. The tendency of the belt to crack under these conditions is greatly accentuated by the fact that the belt is repeatedly subjected to considerable tension. When this embrittlement and cracking occur, the belt is no longer useful for its purpose and the process must be interrupted and the belt removed and discarded, and replaced by a new belt, which deteriorates in the same way after a short period of use.

Thus, the embrittlement and cracking of the vulcanized rubber belt by the action of heat in contact with a vulcanizable rubber composition occasions considerable inconvenience and waste of material, and consequently adds greatly to the cost of manufacturing the highly elastic fabric. For many years the art has been unable to remedy this situation.

We have found that deterioration of the vulcanized rubber belt under the conditions described can be prevented by contacting the vulcanized rubber belt, prior to subjecting to such condition, with aqueous hydrochloric acid of a certain concentration range, for a suitable period of time; and we have further found that this treatment can be carried out without adversely affecting the physical properties of the belt, provided that the vulcanized rubber belt contains less than 10 parts by weight of zinc oxide or equivalent combined zinc activator of vulcanization per 100 parts of rubber. We have discovered that exposure of the rubber belt to an aqueous solution of hydrochloric acid in the manner of this invention results in a change in the character of the surface layers of the belt whereby the belt is rendered immune to the deteriorating effect of migratory sulfur at elevated temperatures for extended periods of service without deleteriously affecting the vulcanization of vulcanizable compositions in contact with the belt as described above. The protection afforded by our treatment is believed to be due to the fact that the hydrochloric acid reacts with the zinc oxide or equivalent combined zinc activators and zinc bearing accelerators in the outer layers of the vulcanized rubber in a manner preventing the combination of sulfur and consequent over-vulcanization of the surface layers when the rubber is subsequently heated in the presence of a composition containing migratory sulfur.

According to the invention, the vulcanized rubber belt containing less than 10 parts of combined zinc activator per 100 parts of rubber, is treated with an aqueous solution containing 25 to 33 weight-percent, preferably 29 weight-percent of hydrochloric acid, that is, two to eight volumes of ordinary concentrated hydrochloric acid (36 weight-percent concentration), preferably four volumes, to one volume of water, usually for a period of from 2 to 100 hours, preferably 24 to 48 hours.

The concentration of aqueous hydrochloric acid employed must be not more than that corresponding to a mixture of ordinary concentrated hydrochloric acid and water in volume ratio of 8:1 (i. e., 33 weight-percent hydrochloric acid). If more concentrated acid is employed, the surface of the belt becomes resinified, either due to cyclicization of the rubber, or due to formation of rubber hydrochloride, or due to both, with the result that the belt becomes embrittled and of no use for the purpose at hand. The tendency of strong acid to undesirably resinify and embrittle the surface of the belt increases with increasing time of treatment.

It is preferable to employ a less concentrated solution, such as a solution of concentrated hydrochloric acid in water in volume ratio of 4:1 (29 weight-percent hydrochloric acid), in order to avoid the danger of resinifying the surface. At room temperature, this concentration will be found to give a protective layer about 0.013" thick on the surface of a belt containing 5 parts of zinc oxide in about 24 hours. Somewhat more concentrated solutions of acid may be employed up to a volume ratio of concentrated acid to water of 8:1, particularly if the belt contains only a small amount of zinc oxide, say 3 parts or less. Solutions less concentrated than 4:1, say 2:1 (25 weight-percent hydrochloric acid), may be preferable when the belt contains a relatively large amount of zinc oxide, say 9 parts, but it will be understood that the more dilute hydrochloric acid solutions will require a longer time of treatment. Conversely, the more concentrated hydrochloric acid solutions require a shorter time of treatment.

This ability of suitably diluted hydrochloric acid to protect the belt from embrittlement is particularly unexpected in view of the fact that concentrated hydrochloric acid itself actually causes embrittlement, due to resinification of the rubber. The novelty of our process is further emphasized by the fact that our treatment is effective in the absence of common rubber solvents or swelling agents such as benzene or the like, and our invention thereby eliminates the great fire hazard and dangerous toxicity hazard presented by the use of such a solvent or swelling medium.

We have found that this treatment with aqueous hydrochloric acid can be carried out without adversely affecting the physical properties of the belt, provided that the vulcanized rubber belt contains less than 10 parts by weight of zinc oxide or equivalent combined zinc activator per 100 parts of rubber. If the belt contains 10 parts or more of zinc oxide or its equivalent per 100 parts of rubber, the acid treatment causes the treated belt to become brittle and useless when exposed to heat, even in the absence of migratory sulfur. This effect becomes more marked the higher the concentration of the aqueous hydrochloric acid employed in the treatment, and is also more marked the longer the time of the treatment. For this reason, it is undesirable to prolong the treatment for more than 100 hours, particularly if the belt contains more than about 5 parts of zinc activator. It may be stated that if the belt contains as much as 9 parts of zinc oxide, or equivalent activator, the recommended maximum time of treatment is 24 hours at a hydrochloric acid dilution of 4:1. The compound from which the belt is made must contain at least a small amount of zinc oxide or equivalent combined zinc activator, say 1 part per 100 parts rubber, to activate the vulcanization of the compound. Thus the articles treated generally contain at least 1% but less than 10% of zinc oxide or equivalent combined zinc activator based on the rubber.

Fig. 2 of the drawing shows a preferred method of carrying out the treatment of a vulcanized rubber belt with an aqueous solution of hydrochloric acid. The treating solution 29, for example a 29 weight-percent solution of hydrochloric acid, i. e., four parts by volume of ordinary concentrated hydrochloric acid in one part of water, is contained in a suitable trough 25. A cloth liner 26 such as a loosely woven cotton cloth is passed from the roll 27 under rollers 28 immersed in the treating solution 29 in the trough 25, thereby saturating the cloth with the treating solution. The vulcanized rubber belt 30 to be treated is fed from a roll 31 and is wound up with the saturated cloth liner on a roll 32. The belt and cloth liner are permitted to remain in contact in this wound condition at room temperature for a sufficient length of time for the hydrochloric acid to diffuse from the aqueous solution in the cloth liner into the surface layers of the vulcanized rubber belt and effect the desired penetration and treatment. A suitable length of time for this to occur is, for example, about 24 hours, during which time the characteristics of the surface layers of the vulcanized belt will have been altered to a depth of about 0.013 inch. As indicated previously, the time of treatment will vary inversely with the concentration of the acid, and the treatment should not be so prolonged as to produce undesirable resinification or hardening of the surface, which would increase the tendency to embrittlement and make the belt useless for its intended purpose. Therefore, within the recommended treatment time range of 2 to 100 hours, the longer treatment times will preferably be used only with the more dilute acid solutions, and the more concentrated acid solutions will preferably be used only with the shorter treatment times, to avoid resinification of the surface. The excess acid may be rinsed off before the belt is used.

Fig. 3 represents the appearance of a cross-section of a portion of the vulcanized belt after it has been subjected to the above treatment. The interior portion 35 of the belt remains unaltered and retains its original opaque appearance due to the presence of zinc oxide. However, the outer layers 36 and 37 of the improved belt, wherein the hydrochloric acid has reacted with a considerable amount of the zinc oxide, take on a distinctly different appearance, typically becoming dark in color and somewhat translucent compared to the unaltered interior portion 35. The exact nature of the change in appearance of the treated surface layers will vary somewhat, depending on whether or not the rubber compound contains carbon black, pigments, etc., but in all cases the treated surface layers will be observed to have a distinctly different color or reflectivity, compared to the inner untreated part of the belt. This visible change can be observed by cutting a very small transverse section from the end of the belt.

The treatment of the vulcanized surface with the aqueous hydrochloric acid is continued until the rubber has been penetrated and altered in appearance to a substantial depth, that is, to a depth sufficient to give whatever degree of protection from embrittlement is desired for the particular service conditions to which the rubber will be subjected in use. The thickness of the altered surface layer may be directly proportional to the severity of the service conditions encountered and inversely proportional to the frequency of renewal of the protection which is contemplated. Thus, for mild service or where frequent re-treatment is intended, alteration of an extremely thin surface layer may be sufficient. On the other hand, for severe service or where infrequent renewal of protection is desired, alteration of a relatively thick surface layer will be desirable. Usually it will be found satisfactory to continue the treatment until at least the outer 0.005" of the rubber has been rendered partially translucent or otherwise altered in appearance by the acid. Of course, the treatment may be prolonged until a greater depth, or even the entire belt, has been affected. In practice it is generally found advisable to continue treatment until at least 0.015" of the rubber has been rendered partially translucent.

After this treatment, the vulcanized belt can be used in service for extended periods in the manner described above without any embrittlement or cracking. The so-treated vulcanized belt has been found to have a useful production life five or more times longer than the useful life of a similar but untreated vulcanized belt. After using the belt in service for an extended period of time, the treatment with aqueous hydrochloric acid may be repeated to renew the resistance of the belt to the deteriorating effects of migratory sulfur. Thus, the improved belt makes possible more convenient and economical production of elastic fabrics, without in any way affecting the vulcanization of same. The process of making the improved belt can be carried out easily with simple equipment, without any fire hazard or dangerous toxicity hazard.

The treating process of this invention does not require elevated temperatures, and is most conveniently carried out at room temperatures. However, the treatment may be carried out at temperatures up to and including the boiling point of the acid. At such elevated temperatures, the time required for the treatment is considerably less than the time required at room temperature. For example, a 2-hour treatment with 29 weight-percent aqueous hydrochloric acid at the boiling point of the aqueous acid produces a depth of penetration equivalent to that produced in about 12 hours at room temperature.

*Example*

The following formulation was cured by heating for 45 minutes in a mold heated with steam under 40 p. s. i. pressure.

| | Parts by weight |
|---|---|
| Smoked sheet | 100 |
| Zinc oxide | 5 |
| Tetramethyl thiuram disulfide | 3 |
| Antioxidant | 3 |
| Filler | 27 |

The resulting vulcanizate was treated for various times by soaking in a solution of concentrated hydrochloric acid in water in volume ratio of 4:1. Visual inspection of cross-sections of the treated vulcanizates showed that protective surface layers of varying thickness had been formed as follows:

| Time of Treatment | Depth of Penetration |
|---|---|
| hours | inch |
| 18 | 0.012 |
| 48 | 0.016 |
| 114 | 0.022 |

Samples of the vulcanizates were covered with powdered sulfur and placed overnight in an oven heated at 100° C. The treated samples were in good condition after this exposure to sulfur and heat, but a similar untreated sample was embrittled and could not be flexed without cracking.

Similar treatment with undiluted hydrochloric acid (common concentrated hydrochloric acid, 36 weight-percent HCl) resulted in resinification of the surface of the stock with consequent embrittlement.

Treatment of a similar rubber stock containing 10 parts of zinc oxide with acid of 4:1 concentration resulted in development of a brittle condition in the surface of the stock upon exposure of the stock for a short time (½ hour or more) to temperatures normally encountered in service (e. g., 210–240° F.).

While the example shows treatment of a vulcanizate of natural rubber, our invention is applicable to soft elastic vulcanized rubber articles made from any sulfur-vulcanizable elastic rubber such as butadiene-styrene rubbery copolymers, butadiene-acrylonitrile rubbery copolymers, etc.

Having thus described our invention, what we claim and desire to protect by Letters Patent is:

1. A method of treating a vulcanized rubber belt, containing from 1 to less than 10 parts by weight of a combined zinc activator of vulcanization per 100 parts of rubber, which comprises winding up said belt with a cloth liner containing a 25 to 33 weight-percent solution of hydrochloric acid in water and maintaining said belt and cloth in wound condition for from 2 to 100 hours, whereby the said vulcanized belt is protected from embrittlement by subsequent exposure to migratory sulfur at elevated temperature.

2. A method of rendering a soft, elastic vulcanized rubber article, containing from 1 to less than 10 parts by weight of a combined zinc activator of vulcanization per 100 parts of rubber, resistant to the normal embrittling effect of exposure to migratory sulphur at elevated temperatures comprising in combination the steps of treating the soft, elastic vulcanized rubber article by contacting the surface thereof with an aqueous solution of hydrochloric acid consisting of from 8 to 2 volumes of ordinary concentrated hydrochloric acid diluted with 1 part of water, for a period of time within the range from 2 hours to 100 hours, the longer treatment times within the said time range being employed only with the lower concentrations of acid within the said concentration range, and, conversely, the higher concentrations of acid within the said concentration range being employed only with the shorter treatment times within the said time range, to avoid resinification and embrittlement of the said surface by the action of the acid, said treatment being continued for a period of time within the said time range sufficient for the acid to penetrate the said surface to a depth of at least about 0.005 inch to react with the zinc therein and thereby impart to the said surface the property of substantially resisting embrittlement when heated in contact with sulphur, and thereafter, while the said surface still remains in a soft, elastic non-resinified condition, discontinuing said treatment by removing the article from further contact with said acid, thereby imparting to the article the property of remaining soft and elastic even after service in contact with vulcanizable compositions at elevated temperatures.

3. A soft, elastic vulcanized rubber article containing from 1 to less than 10 parts by weight of combined zinc activator of vulcanization per 100 parts of rubber, produced by the method of claim 9 and characterized by the property of having a soft, elastic non-resinified surface that resists over-vulcanization and embrittlement upon exposure to migratory sulphur at elevated temperature.

4. A method of rendering a soft, elastic vulcanized rubber article, containing from 1 to less than 10 parts by weight of a combined zinc activator of vulcanization per 100 parts of rubber, resistant to the normal embrittling effect of exposure to migratory sulphur at elevated temperatures comprising in combination the steps of treating the soft, elastic vulcanized rubber article by contacting the surface thereof with an aqueous solution of hydrochloric acid consisting of 4 volumes of ordinary concentrated hydrochloric acid diluted with 1 part of water, for a period of time within the range from 24 to 48 hours, said period of time being sufficient for the acid to penetrate the said surface to a depth of at least about 0.005 inch to react with the zinc therein, and thereby impart to the said surface the property of substantially resisting embrittlement when heated in contact with sulphur, and thereafter, while the said surface still remains in a soft, elastic non-resinified condition, discontinuing said treatment by removing the article from further contact with said acid, thereby imparting to the article the property of remaining soft and elastic even after service in contact with vulcanizable compositions at elevated temperatures.

5. In a method of making an elastic fabric including the step of applying a vulcanizable latex containing sulphur to a textile fabric, and vulcanizing the latex deposit in contact with a soft, elastic vulcanized rubber belt at elevated temperatures, said belt containing from 1 to less than 10 parts by weight of a combined zinc activator of vulcanization per 100 parts of rubber, wherein the repeated exposure of said vulcanized rubber belt to migratory sulphur and vulcanizing temperatures normally results in embrittlement and cracking of the belt, the improvement which comprises in combination the steps of contacting the surface of the said vulcanized belt prior to use with aqueous hydrochloric acid consisting of from 8 to 2 volumes of ordinary concentrated hydrochloric acid diluted with 1 part of water, for a period of time within the range from 2 hours to 100 hours, the longer treatment times within the said time range being employed only with the lower concentrations of acid within the said concentration range, and, conversely, the higher concentration range acid within the said concentration range being employed only with the shorter treatment times within the said time range, to avoid resinification and embrittlement of the said surface by the action of the acid, said treatment being continued for a period of time within the said time range sufficient for the acid to penetrate the said surface to a depth of at least about 0.005 inch to react with the zinc therein and thereby impart to the said surface the property of substantially resisting embrittlement when heated in contact with sulphur, and thereafter, while the said surface still remains in a soft, elastic non-resinified condition, discontinuing said treatment by removing the belt from further contact with said acid, thereby imparting to the belt the property of remaining soft and elastic even after repeated exposure to said vulcanizable latex at elevated temperatures.

BERNARD C. BARTON.
EDWARD E. AUER.

REFERENCES CITED

The following references are of record in the file of this patent:

UNITED STATES PATENTS

| Number | Name | Date |
| --- | --- | --- |
| 1,810,560 | Garvey | June 16, 1931 |
| 1,919,766 | Beal | July 25, 1933 |
| 2,032,923 | Eldridge | Mar. 3, 1936 |
| 2,260,143 | Juve | Oct. 21, 1941 |

FOREIGN PATENTS

| Number | Country | Date |
| --- | --- | --- |
| 535,983 | Great Britain | Apr. 29, 1941 |